United States Patent

[11] 3,604,367

| [72] | Inventor | Frances B. Arries<br>P.O. Box 63, Pengilly, Minn. 55775 |
|---|---|---|
| [21] | Appl. No. | 823,842 |
| [22] | Filed | May 12, 1969 |
| [45] | Patented | Sept. 14, 1971 |

[54] APPARATUS FOR MAKING A FOOD PRODUCT
9 Claims, 4 Drawing Figs.

| [52] | U.S. Cl. | 107/69 |
|---|---|---|
| [51] | Int. Cl. | A21c 11/10 |
| [50] | Field of Search | 107/68, 69, 70, 4 |

[56] References Cited
UNITED STATES PATENTS

| 2,666,398 | 1/1954 | Gendler et al. | 107/69 |
|---|---|---|---|
| 3,225,717 | 12/1965 | Page | 107/69 |
| 3,230,901 | 1/1966 | Zones | 107/69 |

*Primary Examiner*—Henry S. Jaudon
*Attorney*—Schroeder, Siegfried and Ryan

ABSTRACT: A method and apparatus for making a bread type food product which, in its finished form, will have a hole therein. The method includes the step of rolling dough to a flattened form and thereafter rolling the flattened dough on a tubular member with the dough overlapping the tubular member at one end such that it may be sealed to provide a closed extremity to the resultant product. The machine for performing the method includes a structure for placing tubes on the flattened dough and thereafter engaging the dough and causing it to roll upon itself and the tube in a spiral manner to provide a generally cylindrical rolled dough mass which will thereafter be suitably cooked or baked.

PATENTED SEP 14 1971
3,604,367
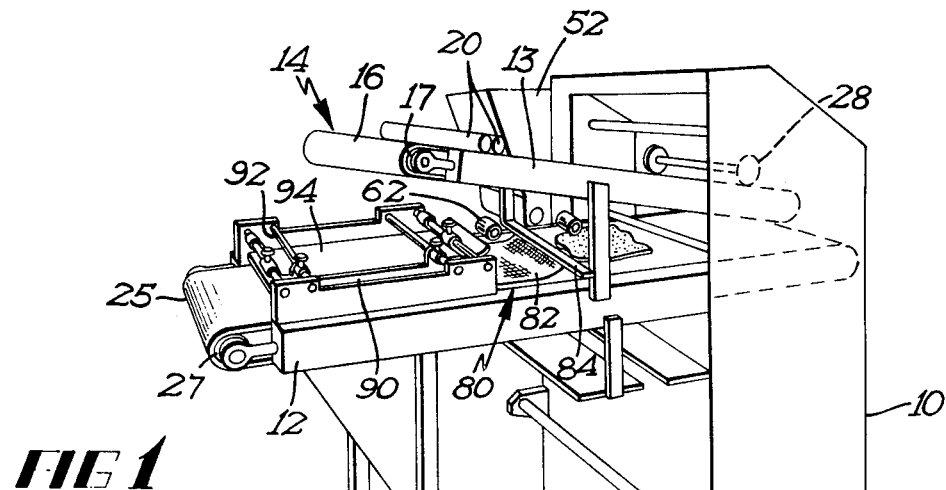
FIG 1
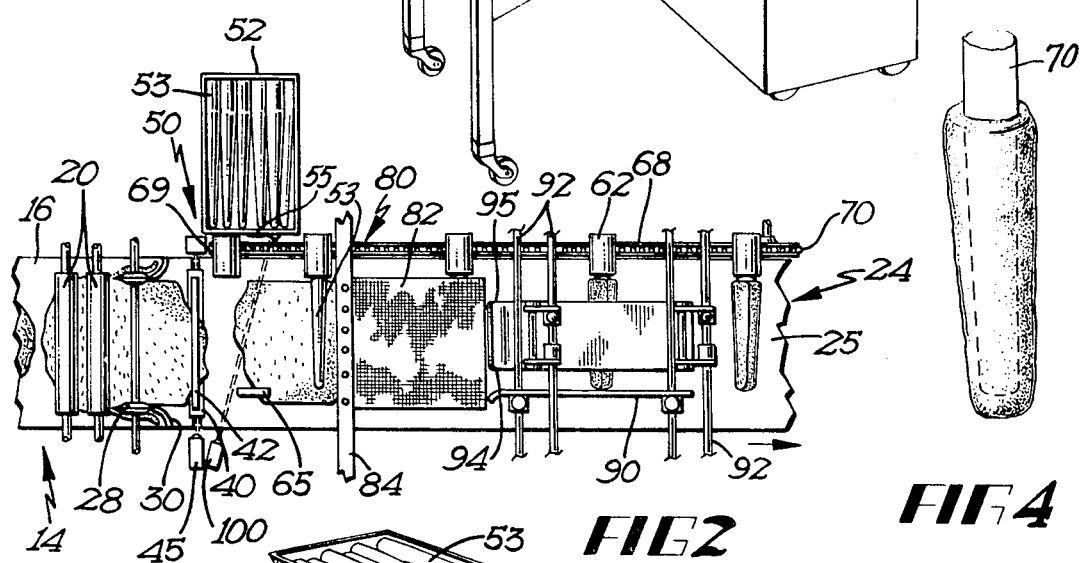
FIG 2
FIG 4
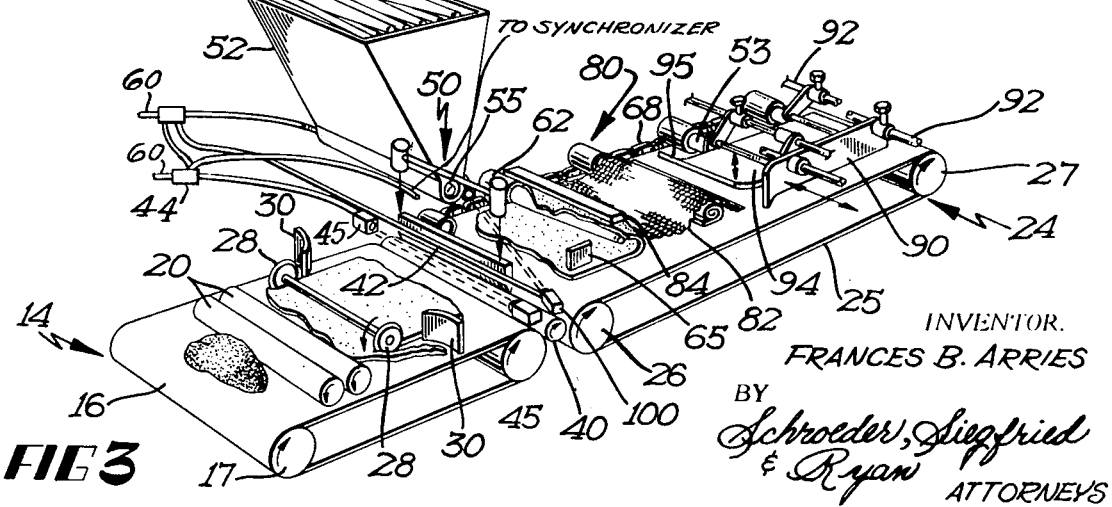
FIG 3
INVENTOR.
FRANCES B. ARRIES
BY
Schroeder, Siegfried
& Ryan
ATTORNEYS 3,604,367

APPARATUS FOR MAKING A FOOD PRODUCT

My invention relates to a method and apparatus for making a food product and more particularly to an improved method and apparatus for making a rolled food product in which the food product is rolled on a tube and cooked thereon to provide a hole in the resultant product.

At the present time, certain types of bread and pastry forming apparatus employ a method of processing the dough forming the end product with a rolling step to flatten the dough after which the dough is rolled upon itself spirally to form a cylindrical solid mass which is ultimately shaped and baked or otherwise cooked to form the end product. Structures for performing this method are known and in use. Where the cooked or baked food product is to be generally cylindrical in structure, such as a bun type with an aperture or hole formed in the same, the method and machinery for performing the method has included various types of molding tins or structures which insert a hole forming medium after the product is cooked to define the hole in the end product. None of these have been particularly satisfactory from a standpoint of continuous making of food products, such as buns or a pastry product similar thereto, in which the ultimate end product is to have a hole partially through the same with a sealed extremity for the purpose of inserting a secondary food product, such as a weiner or sausage or filling.

My improved method and apparatus of making a food product is directed to the making of a baked food product, such as a bun or similar pastry product, in which the dough is flattened through a rolling step and suitably shaped after which a tapered tube is placed on the dough with the dough being rolled up on the tube and itself spirally and with a portion of the tube extending from one end of the rolled dough product. The opposite end is pinched or suitably sealed and the dough product is then baked to provide the ultimate bun type shape or pastry type shape with a hole therein which is defined after the tube is removed after baking or similar cooking. This provides an ideal bun or similar pastry in which a sausage or weiner or filling may be placed, and with suitable additional condiments, as desired, which will permit eating of the bread product or pastry product with the filling therein while preventing escape of any of the filling or liquid portion thereof. The improved machine for performing this method includes a structure for inserting a hollow tubular member or tube on the dough prior to rolling and for guiding the same to permit rolling of the dough spirally thereon with the sealing of the dough at one end so that the ultimate rolled dough product may be handled, cooked and the tube removed.

Therefore, it is the principal object of this invention to provide an improved method of making a bread type food product with a hole therein.

Another object of this invention is to provide an improved apparatus for making a bread type food product with a hole therein.

A further object of this invention is to provide in an improved apparatus, means for rolling a flattened dough onto a tubular member and for guiding the tubular member to insure accurate positioning of the same therein.

Another object of this invention is to provide an improved method and apparatus for making a bread type food product which is particularly adapted for continuous processing.

A still further object of this invention is to provide a simplified machine for performing the improved method of making a bread type food product with a hole therein.

A still further object of this invention is to provide an improved method and apparatus for making a bread type food product which is low in cost, and easy to use and maintain.

These and other objects of this invention will become apparent from a reading of the attached description together with the drawings, wherein:

FIG. 1 is a perspective view of the improved apparatus for making the bread type food product;

FIG. 2 is a schematic plan view of the machine of FIG. 1 outlining the improved method;

FIG. 3 is a perspective view of the machine of FIG. 2; and

FIG. 4 is a perspective view of the ultimate food product.

My improved machine for making the rolled food product with a hole therein is shown in FIGS. 1 and 2 and schematically in FIGS. 3 and 4 to determine the overall relationship of parts. In FIGS. 1 and 2, the improved machine incorporates an upright frame structure, generally indicated at 10, with a main bed portion 12 and a raised bed portion 13, each of which have associated therewith belt type conveyors. Thus, as will be seen in FIG. 1, the upper conveyor 14 is formed by a belt 16 having a roller guide means 17 associated therewith (one of which is driven) to define the input end of the bread rolling and forming machine upon which predetermined amounts of mixed dough is placed. Within the upright frame 10 of the machine is a plurality of rollers 20 shown in phantom in FIG. 1 which operate with the input conveying belt 14 to knead or flatten the bread type dough into elongated flattened form. From the upper or input conveyor 14, the dough is transferred to the lower bed 12 having an output conveyor 24 formed by the canvas belt 25 with associated rollers 26, 27 which mount and drive the same. The actual detail of the dough flattening rollers 20 are omitted and the rollers are shown only schematically since this apparatus may take a variety of forms and is known and in use. Associated with the input conveyor or belt 16 are a plurality of rotary cutters 28 which operate to trim the edges of the flattened dough for the purpose of shaping the same into a generally rectangular dough form with the excess material trimmed by the rollers being removed by separating plates 30 positioned in and associated with the input conveyor 14.

In addition, the rolling apparatus may include a trim metal roller 40 positioned between the input and output conveyors and driven with the input conveyor which is synchronized with or controlled by relay circuit through the operation of the output conveyor in a conventional manner. It may also include a trimming knife 42 suitably operated through a mechanism, such as a motive device 43 powered an air source, and controlled by a photocell, indicated at 45, operating a controller 44 for the motive device which would trim the trailing edge of the generally rectangular form to cut the dough to a desired length after the flattened and the trimmed dough leaves the trim roller. After the dough leaves the trimming apparatus, should it be used, it will be transferred to the output conveyor 12 or the belt 25 thereof wherein it passes a tube loading station, indicated generally at 50. This includes a tube hopper 52 with a plurality of tapered tubular members 53 therein which are closed at one end and having a discharge extremity 55 through which the individual tubes are dispensed through a suitable motivating means, such as an air blast source 60, to direct the tubes through a tube holder 62 when the tube holder and the dough are in front of the discharge extremity 55 of the hopper; and guide the same toward a tube stopping mechanism 65 suspended on the frame and positioned over the belt. This will locate the tube across the leading edge of the dough and with the tapered extremities slightly inward of the edge of the dough with the free extremity of the tube extending beyond the opposite edge of the dough and being retained in the tube holder. The tube holder is one of a plurality of tube holders mounted on a chain drive 68 positioned on the side of the frame and driven by suitable sprockets 69, 70 one of which is geared to the drive mechanism of the belt assembly 25 or the drive roller 27 thereof to move in unison and at the same speed as the belt along the edge of the same. A suitable synchronizing control indicating the presence of the tube holder relative to the hopper may be used with the photocell detecting presence of the dough at the transfer or trim roller to control the operation of the trim roller and input conveyor to synchronize the same to the output conveyor in a conventional manner. This will position the tube on the dough in the same relative position to the belt and advance the extremity of the tube as the dough is rolled on the same in the manner to be hereinafter described. Beyond the tube loading station is a rolling structure, indicated generally at 80 and formed by a rectangular mesh screen 82 suspended from a bar structure 84 mounted on one edge of the frame or across the same clear of the drive sprockets and chain drive 68 holding the guide tube 62. The screen is a loose mesh which will be suspended toward and be in contact with the belt 25 as it moves such that it will contact the dough and cause the leading edge of the same to move backwards or roll up on the tube continuing the rolling process spirally about the tube and on itself with the screen raising with the increased size of the rolled tube and dough to allow the tube to roll beneath the same. The tube holder 62 will guide the free end of the tube 53 during the rolling process and will move beneath the screen and its supporting rod 84 to maintain the same relative position on the belt 25. Near the discharge end of the belt is a flattening structure or dough guide structure 90 having a supporting frame 92 and a deflecting plate 94 positioned at one edge of the same aligned with the edge of the rolled dough and slightly removed from the end of the tube therein. The opposite side of this supporting structure, as indicated at 95, may be positioned above the belt and guide holders 62 with the drive for the same so as to present no obstruction thereto and is adjustable for clearance purposes. The deflecting plate will cause the rolled end of the dough extending beyond the end of the tube 53 to be sealed as it passes beneath the same while the opposite extremity of the rolled dough will carry the exposed tubular extremity carried in the tube holder until the end of the belt is reached. At this point, the rolled dough product with the tube therein will be removed from the dough holder and belt and placed on a tray for baking. The operation of the tube holding apparatus is controlled through a suitable photocell 100 detecting the leading edge of the dough and synchronize with the presence of the tube holder at this point as it approaches the tube holder to operate the motive mechanism 60 for moving a tube 53 onto the leading edge of the dough.

In my improved method and apparatus for making a food product, particular application has been directed toward the making of a bun or bread type baked food product with a hole therein in which the mixed dough for the same is rolled to a flattened form, and trimmed if desired, and thereafter placing a tubular member on the dough at the leading edge of the same and causing the dough to be rolled on the tubular member while thereafter sealing the rolled end of the dough at one extremity thereof with the opposite end of the rolled dough having the exposed opposite extremity of the tubular member therein. This dough product may then be baked or otherwise cooked in this form in any conventional oven or cooking apparatus (not shown) and the tube removed after the product has been baked or cooked to a finished form. The particular tubular members are formed of a ceramic material which have the characteristics of preventing the baked food product from sticking thereto such that they may be readily moved and the tube is tapered to facilitate removal of the same. The improved apparatus employs a conventional rolling structure and includes therewith a simplified trimming structure including a leading or rear edge trimmer to obtain a particular dough size for rolling purposes. The latter may be modified, if desired. The structure for rolling the flattened dough on the tube incorporates a screen or similar structure which will adhere to the leading edge of the dough causing the same to raise and roll on the tube while permitting the rolled dough with the tube therein to pass beneath the same. This improved structure permits continuous manufacture of a bread or similar pastry making apparatus in which the desired end product has a hole therein which may be filled with a suitable filling, such as a meat or custard, and will be sealed at one extremity of the same so that leakage therefrom will be prevented.

What is claimed is:

1. A machine for making a food product comprising, a frame mounting a dough rolling apparatus adapted to receive a quantity of mixed dough and roll it into a thin elongated rolled form, said dough rolling apparatus including at least one conveyor belt for advancing the dough toward a discharge extremity of the machine on the frame, a tube feeding apparatus positioned on the frame adjacent said last-named conveyor belt and adapted to feed hollow tubular members onto the leading edge of a rolled dough on the conveyor belt as it is advanced toward the discharge end of the machine, a tube guide apparatus positioned adjacent the tube feeding apparatus and adapted to receive and hold one extremity of the tubes fed onto the conveying belt at the dough thereon, said tube guiding apparatus including a secondary belt drive adapted to move the guide structure with the dough on the conveying belt, means positioned above the conveying belt on the frame and adapted to contact a leading edge of the rolled dough adjacent a tube causing it to roll on the tube and itself until the tube is completely surrounded with one end of the tube being positioned in the tube guide apparatus, and means positioned near the discharge end of the conveying belt and above the same adapted to contact one edge of the rolled dough on the tube to seal the same around the end of the tube.

2. The machine of claim 1 and including dough shaping apparatus included with the dough rolling apparatus and having trimming knives associated therewith to trim the flattened rolled dough such that the side surface of the same is generally parallel.

3. The machine of claim 1 in which the dough rolling apparatus includes at least two sets of conveyors with a plurality of thinning rollers therebetween with said one of said sets receiving the dough from the thinning rollers and moving the rolled dough to the discharge end of the machine.

4. The machine of claim 1 and including a dough guide apparatus positioned above the conveying belt and adjacent the dough contacting and rolling means to guide the side edges of the rolled dough.

5. The machine of claim 1 in which the tube feeding apparatus includes a hopper for holding a plurality of tubes and a discharge structure associated therewith together with means for moving a tube from the hopper discharge through the tube guide apparatus.

6. The machine of claim 5 and including a tube stopper positioned opposite the tube feeding apparatus and above the conveying belt to restrict movement of the tube relative to the conveying belt and the dough thereon.

7. The machine of claim 5 in which the tube guide apparatus includes a plurality of cylindrical guide members mounted on a guide drive belt and positioned adjacent a portion of the conveying belt common with the discharge extremity of the machine being simultaneously moved therewith at the same speed of movement as the conveying belt.

8. The machine of claim 1 in which the means positioned above the belt and adapted to contact the leading edge of the dough to roll the same is an elongated screen member suspended above the belt at one edge thereof and contacting the belt at the free edge thereof being free to move with the rolled dough.

9. The machine of claim 8 and including a platelike structure connected to and cooperating with the means positioned above the belt for sealing the end of the dough and being adapted to receive the rolled dough from the belt.